US007286256B2

(12) United States Patent
Herbert

(10) Patent No.: US 7,286,256 B2
(45) Date of Patent: Oct. 23, 2007

(54) IMAGE APPLICATION SOFTWARE PROVIDING A LIST OF USER SELECTABLE TASKS

(75) Inventor: Leslie Beth Herbert, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 863 days.

(21) Appl. No.: 10/081,255

(22) Filed: Feb. 22, 2002

(65) Prior Publication Data

US 2003/0161003 A1 Aug. 28, 2003

(51) Int. Cl.
G06K 15/00 (2006.01)
(52) U.S. Cl. ..................... 358/1.16; 358/1.15
(58) Field of Classification Search ............... 358/1.15, 358/448, 452, 426.02, 426.04, 426.12, 501, 358/3.24, 3.23, 1.6, 471, 404, 444, 468, 1.16, 358/1.17
See application file for complete search history.

(56) References Cited

U.S. PATENT DOCUMENTS

| | | | |
|---|---|---|---|
| 5,164,831 A | 11/1992 | Kuchta et al. | |
| 5,760,917 A | 6/1998 | Sheridan | |
| 6,243,171 B1 | 6/2001 | Haneda | |
| 6,522,354 B1* | 2/2003 | Kawamura et al. | 348/231.2 |
| 6,715,003 B1* | 3/2004 | Safai | 710/33 |
| 2002/0010722 A1* | 1/2002 | Takayama | 707/527 |
| 2002/0036793 A1* | 3/2002 | Roosen et al. | 358/1.15 |
| 2002/0065844 A1* | 5/2002 | Robinson et al. | 707/500 |
| 2002/0067923 A1* | 6/2002 | Fujimura | 396/429 |
| 2002/0145756 A1* | 10/2002 | Stoecker | 358/1.18 |
| 2003/0014416 A1* | 1/2003 | Kimbell et al. | 707/100 |
| 2005/0154782 A1* | 7/2005 | Yoshida | 709/206 |

OTHER PUBLICATIONS

*CompactFlash Specification Version 1.3*, published by the CompactFlash Association, Palo Alto, California, Aug. 5, 1998.
"Digital Still Camera Image File Format (*Exif*)" version 2.1, Jul. 1998 by the Japan Electronics Industries Development Association (JEIDA), Tokyo, Japan.
"*Design Rule For Camera File System*" version 1.0, Dec. 1998 by the Japan Electronics Industries Development Association (JEIDA), Tokyo, Japan.
*PC Card Standard, Release 2.0*, published by the Personal Computer Memory Card International Association, Sunnyvale, California, Sep. 1991.
"Digital Still Camera Image File Format (*Exif*)" version 2.1, Jul. 1998 by the Japan Electronics Industries Development Association (JEIDA), Tokyo, Japan.
"*Design Rule For Camera File System*" version 1.0, Dec. 1998 by the Japan Electronics Industries Development Association (JEIDA), Tokyo, Japan.

* cited by examiner

*Primary Examiner*—Jerome Grant, II
(74) *Attorney, Agent, or Firm*—Raymond L. Owens

(57) ABSTRACT

A method of using stored digital images transferred from an imaging device includes receiving and storing images from the imaging device in a memory associated with a computer, receiving at least one control file from the imaging device which indicates a prior intention for subsequent use of the stored images, and the computer responding to the control file to create and display a list of tasks selectable by a computer user in accordance with the prior intention. The method also includes the computer user selecting at least one of the tasks from the list, and the computer responding to the user selected task(s) to initiate the use of images indicated by the selected task(s).

13 Claims, 14 Drawing Sheets

```
1   [HDR]
2   GEN REV = 01.10
3   GEN CRT = "KODAK DC4800 ZOOM DIGITAL CAMERA"
4   GEN DTM = 2002:02:12:12:28:10
5   [JOB]
6   PRT PID = 001
7   PRT TYP = STD
8   PRT QTY = 001
9   IMG FMT = EXIF2 -J
10  <IMG SRC = "../DCIM/100K4800/DCP_1686.JPG">
11  [JOB]
12  PRT PID = 002
13  PRT TYP = STD
14  PRT QTY = 001
15  IMG FMT = EXIF2 -J
16  <IMG SRC = "../DCIM/100K4800/DCP_1688.JPG">
17  [JOB]
18  PRT PID = 003
19  PRT TYP = STD
20  PRT QTY = 002
21  IMG FMT = EXIF2 -J
22  <IMG SRC = "../DCIM/100K4800/DCP_1690.JPG">
23  [JOB]
24  PRT PID = 004
25  PRT TYP = STD
26  PRT QTY = 001
27  IMG FMT = EXIF2 -J
28  <IMG SRC = "../DCIM/100K4800/DCP_1692.JPG">
29  [JOB]
30  PRT PID = 005
31  PRT TYP = STD
32  PRT QTY = 003
33  IMG FMT = EXIF2 -J
34  <IMG SRC = "../DCIM/101K3900/DCP_1690.JPG">
35  [JOB]
36  PRT PID = 006
37  PRT TYP = STD
38  PRT QTY = 001
39  IMG FMT = EXIF2 -J
40  <IMG SRC = "../DCIM/101K3900/DCP_1691.JPG">
```

FIG. 4A

```
1    [HDR]
2    GEN REV = 01.10
3    GEN CRT = "KODAK DC4800 ZOOM DIGITAL CAMERA"
4    GEN DTM = 2002:02:12:12:28:10
5    [JOB]
6    PRT PID = 001
7    DES EML = "john@mail.com"
8    DES EML = "suzi@quickmail.com"
9    IMG FMT = EXIF2 -J
10   <IMG SRC = "../DCIM/100K4800/DCP_1686.JPG">
11   <IMG SRC = "../DCIM/100K4800/DCP_1688.JPG">
12   <IMG SRC = "../DCIM/100K4800/DCP_1690.JPG">
13   [JOB]
14   PRT PID = 002
15   DES EML = "tony@yahoomail.com"
16   IMG FMT = EXIF2 -J
17   <IMG SRC = "../DCIM/100K4800/DCP_1690.JPG">
18   <IMG SRC = "../DCIM/100K4800/DCP_1691.JPG">
19   <IMG SRC = "../DCIM/101K3900/DCP_1690.JPG">
20   <IMG SRC = "../DCIM/101K3900/DCP_1691.JPG">
21   [JOB]
22   PRT PID = 003
23   DES EML = "bill@abc.com"
24   IMG FMT = EXIF2 -J
25   <IMG SRC = "../DCIM/101K3900/DCP_1691.JPG">
```

FIG. 4B

IMAGE APPLICATION SOFTWARE PROVIDING A LIST OF USER SELECTABLE TASKS

FIELD OF THE INVENTION

The present invention relates to effectively using digital images and control files produced by a digital camera, and more particularly to using such digital images and control files in a computer to facilitate user selection of particular tasks.

BACKGROUND OF THE INVENTION

As prices of digital cameras fall and image quality improves, more consumers will use digital cameras to fill their image capturing needs. Digital cameras offer many benefits. However, they also present some difficulties. In particular, obtaining high quality prints from digital cameras is not an easy task for most consumers.

As described in commonly assigned U.S. patent application Ser. No. 08/977,382, filed Nov. 24, 1997 by Kenneth A. Parulski et al., entitled "Electronic Camera With 'Utilization' Selection Capability", the disclosure of which is herein incorporated by reference, a digital camera can be used to review images and select images to be printed or emailed to others. The camera creates a control file such as a print order file, which indicates which images are to be printed and how many copies of each image to print, or an email order file, which indicates which image files to email, as well as email addresses of the recipients.

One standard type of control file is the DPOF (digital print order format) file supported by many digital cameras. Another type of control file is described in U.S. Pat. No. 6,243,171 to Haneda. This patent describes a control file that can be used to specify various types of digital prints, typically made by first scanning photographic film.

There are many methods for printing images from electronic cameras. Image files may be transferred to a computer via physically transferring a memory card or by a data link between the computer and the camera. Once the image resides in the memory of the computer, a computer program can be used to print the images on a local printer. Also, a computer may use a modem to transfer images over the phone lines or other communication network to a remote photofinisher, where the images can be printed. While the foregoing methods can be used to obtain prints from the digital image files, they often involve complex and/or repetitive user tasks.

Another method of getting hard copy prints from digital image files captured by an electronic digital camera is to transfer the digital image files directly to a printer, via transferring a memory card or by a data link between the printer and the camera. In this approach, the user can select images to be printed as they review images using an image display on the camera, and the camera can then create a DPOF file listing the images to be printed, which is read by the printer.

Digital images may also be printed at a retail kiosk. In this case, the digital image files are transferred from the camera to the kiosk by physically transferring the memory card, or by transferring the digital image files using a data link between the kiosk and camera. In order to minimize the time spent selecting images at the kiosk, the user may select images to be printed on the camera, and the camera may create a DPOF file, which is read by the kiosk.

A user of a digital camera may create a DPOF file, but then decide to print images using a standard PC to initiate printing either locally or via a network photo service provider. Unfortunately, current systems do not provide an easy way for a user to initiate such printing at a later time.

SUMMARY OF THE INVENTION

It is an object of the present invention to effectively and conveniently permit a user to use his/her designated prior intention to use stored images produced by an imaging device such as a digital camera.

In accordance with one aspect of the present invention there is provided a method of using stored digital images transferred from an imaging device, comprising the steps of:

a) receiving and storing images from the imaging device in a memory associated with a computer;

b) receiving at least one control file from the imaging device which indicates a prior intention for subsequent use of the stored images;

c) the computer responding to the control file to create and display a list of tasks selectable by the computer user in accordance with the prior intention;

d) the computer user selecting at least one of the tasks from the list; and e) the computer responding to the user selected task(s) to initiate the use of images indicated by the selected task(s).

ADVANTAGES

It is an advantage of the present invention that the control file produced by a digital camera can be used by a computer to produce a list of selectable tasks.

It is a further advantage of the present invention that these tasks can be modified by the user on the computer, if desired.

It is a still further advantage of the present invention that the user can delay the initiation of a task until an appropriate time.

It is still further advantage of the present invention to delete the control file and corresponding digital images from the digital memory in the digital camera, prior to performing the tasks indicated in the control file.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings.

FIG. 4A illustrates an example of a print control file;

FIG. 4B illustrates an example of an email control file;

DETAILED DESCRIPTION OF THE INVENTION

The present invention is directed to a computer software program that utilizes control files associated with a group of digital images, when the digital images are transferred to a computer from a digital camera. This software program stores the control information provided by the control files in a work order list, known as a "To Do " list, that allows users to perform the intended tasks (such as printing or emailing images) at a later time. It also allows the user to modify the tasks originally listed in the control files, if desired. In a preferred embodiment, the control files include DPOF Auto Print control files and DPOF Auto Transfer control files.

Figure 1:
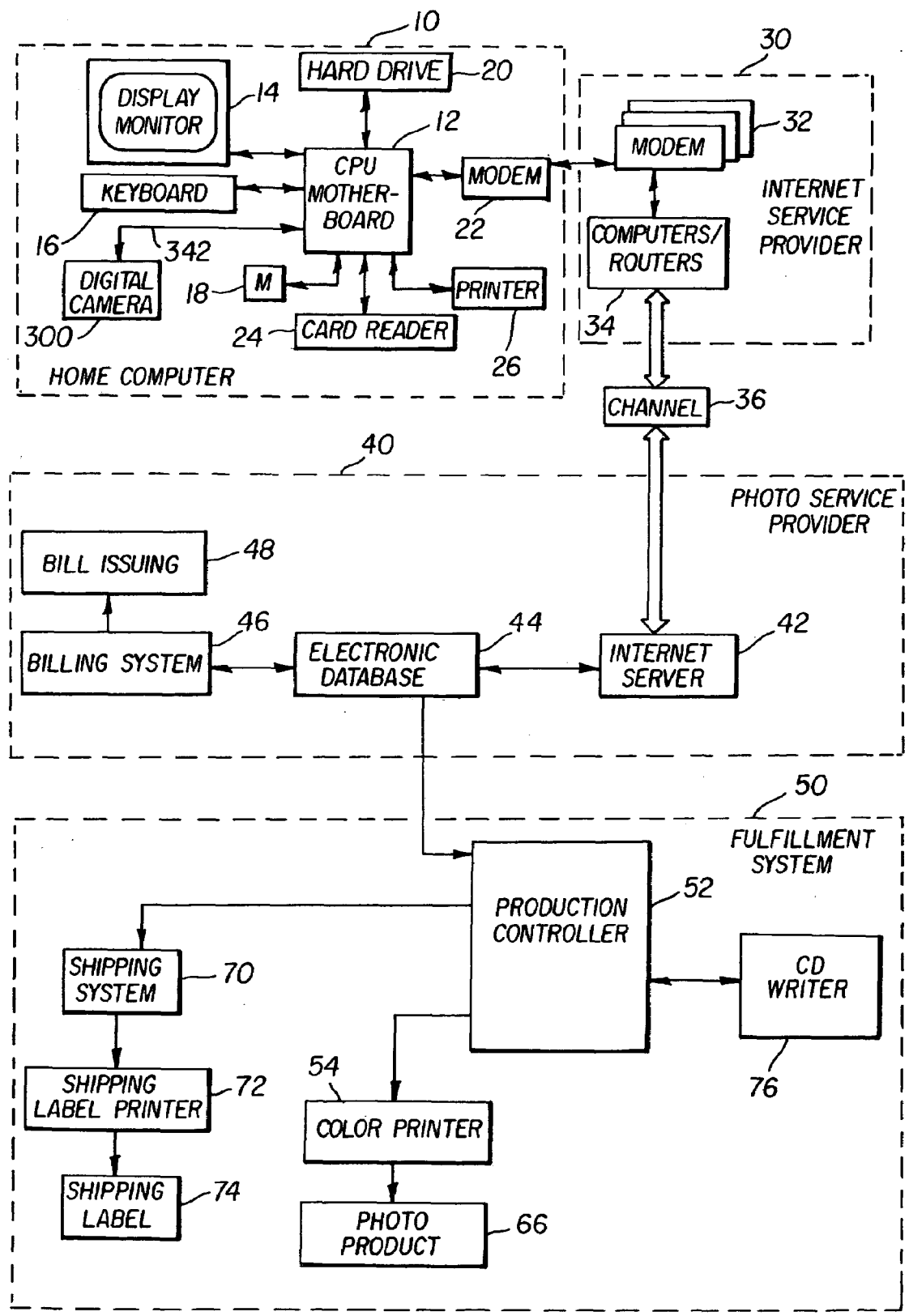
FIG. 1 illustrates in block form a digital imaging system made in accordance with the present invention.

FIG. 1 depicts a block diagram of a system that implements the present invention. As shown in FIG. 1, the system includes a digital camera 300 that captures digital images and creates control files indicating print and email orders, as will be described later in reference to FIG. 2. The digital camera 300 is one example of an imaging device that can be used in a system made in accordance with the present invention. Other examples of imaging devices include motion/still cameras that capture both video and still images, and combination cell phone/digital cameras that can capture and transmit digital images.

The system of FIG. 1 also includes a home computer system 10. The home computer 10 includes a CPU motherboard 12, having for example, an Intel Pentium IV processor as well as RAM memory. The CPU motherboard 12 executes software stored oil a hard drive 20, for example, the well known Windows XP operating system software and the Internet Explorer web browser software, both provided by Microsoft Corp. of Redmond, Wash. The hard drive 20 is also used to store the software that implements the methods of this invention. This software, which can be called "Kodak EasyShare Software", can be provided along with the digital camera 300 using any suitable software distribution media or method, such as a CD-ROM, floppy disc, or Internet download, as is well known to those skilled in the art. As will be described in reference to FIG. 5, hard drive 20 is also used to store images downloaded from the digital camera 300. Hard drive 20 is one type of memory associated with the home computer 10. Other types of memory could alternatively be used with the home computer 10 to store downloaded images, such as solid-state Flash EPROM memory and optical read/write discs.

The CPU motherboard 12 is coupled to a display monitor 14 and a keyboard 16. A mouse 18 permits the user to readily communicate with the CPU motherboard 12. The home computer 10 also includes a dial-up modem 22 for communicating with the Internet Service Provider (ISP) 30 in order to connect to a channel 36, such as the Internet in order to email images. The CPU motherboard 12 can communicate directly with the digital camera 300 over a suitable wired or wireless interface 342, such as the well known USB interface. The CPU motherboard 12 also communicates with a card reader 24, which can read and write data on a removable flash memory card 330 (shown in FIG. 2) used in the digital camera 300. The home computer 10 also includes a printer 26, which communicates with the CPU motherboard 12 over a suitable interface, such as the well known Universal Serial Bus (USB) interface.

In alternative embodiments, other devices, such as a television set-top box or Internet appliance, could be used in place of the home computer 10. Also, the connection between the digital camera 300 and the home computer 10 could utilize a camera dock, such as the Kodak EasyShare camera dock.

The ISP 30, for example, Earthlink Network, Inc. of Pasadena, Calif., includes banks of modems 32, one of which is connected to communicate with the modem 22 of the home computer 10. The modem 32 in turn communicates with computers/routers 34 in order to provide a connection to the channel 36, which is preferably the Internet, using equipment and techniques well known to those skilled in the art. The ISP 30 provides email services using the channel 36.

A photo service provider 40 communicates with a fulfillment system 50, which is comprised of one or more computers and associated peripherals for producing photoproducts, such as hardcopy prints, album pages, photo mugs, PictureCD discs, and the like. The fulfillment system 50 includes a computer that serves as a production controller 52, and controls one or more color printers 54, which can produce photoproducts 66 such as album pages or standard hardcopy prints. The hardcopy prints can be of various sizes, and can be sold in frames. The production controller 52 is also connected to a CD writer 76, which can produce PictureCDs having digital images and application software for using the digital images. The production controller 52 can optionally be connected to devices (not shown) for producing other types of photoproducts 66 such as t-shirts, coffee mugs, etc. incorporating one or more images uploaded by the user. The production controller 52 also controls a shipping system 70, which controls a shipping label printer 72 to produce a shipping label 74. The shipping label 74 is attached to a shipping container (e.g., a cardboard box containing packing material) that contains and protects the photoproduct 66 during shipment (e.g., via air express mail, ground carrier, etc.) to the user or the user's designee.

The electronic database 44 provides information describing numerous photoproducts that can be provided by the fulfillment system 50, as described in commonly assigned U.S. patent application Ser. No. 09/576,288, filed May 23, 2000 entitled "Method for Providing Customized Photoproducts Over a Network" by Kenneth A. Parulski, the disclosure of which is incorporated herein by reference. This includes information describing photoproduct options, for example, album features such as providing various background colors or textures, page numbers, page captions, image captions, etc. The album pages can be bound in a cover, or can include holes to permit the pages to be inserted into a standard binder, such as a three-ring binder. These album feature options can be demonstrated via software programs, for example, JAVA applets, MPEG or QuickTime movies, or Shockwave files, which depict the functionality of features that the customer can choose.

The electronic database 44 includes information describing each customer account, including user billing information. The billing information can include a payment identifier for the user, such as a charge card number, expiration date, and user billing address. The electronic database 44 can optionally provide long-term storage of the uploaded images for each user. In this case, stored images are accessible (e.g. viewable) via the Internet by authorized users, as described, for example, in commonly assigned U.S. Pat. No. 5,760,917 to Sheridan, the disclosure of which is herein incorporated by reference. The electronic database 44 can be provided by the same computer as the network server 42, or can utilize a separate computer, or can be distributed over several computers at the same physical site, or at different sites.

On a regular basis (e.g. monthly) or alternatively whenever a photoproduct 66 is purchased by the user, the electronic database 44 communicates with a billing system 46 to verify that the payment identifier (e.g., credit card or debit card number) provided by the customer is valid, and to debit the account for the purchase or the monthly service fee for providing information to the user and storing user images. As shown in block 48, the bill is issued. The customer's account that is debited can, of course, be located at a remote financial institution.

Figure 2:
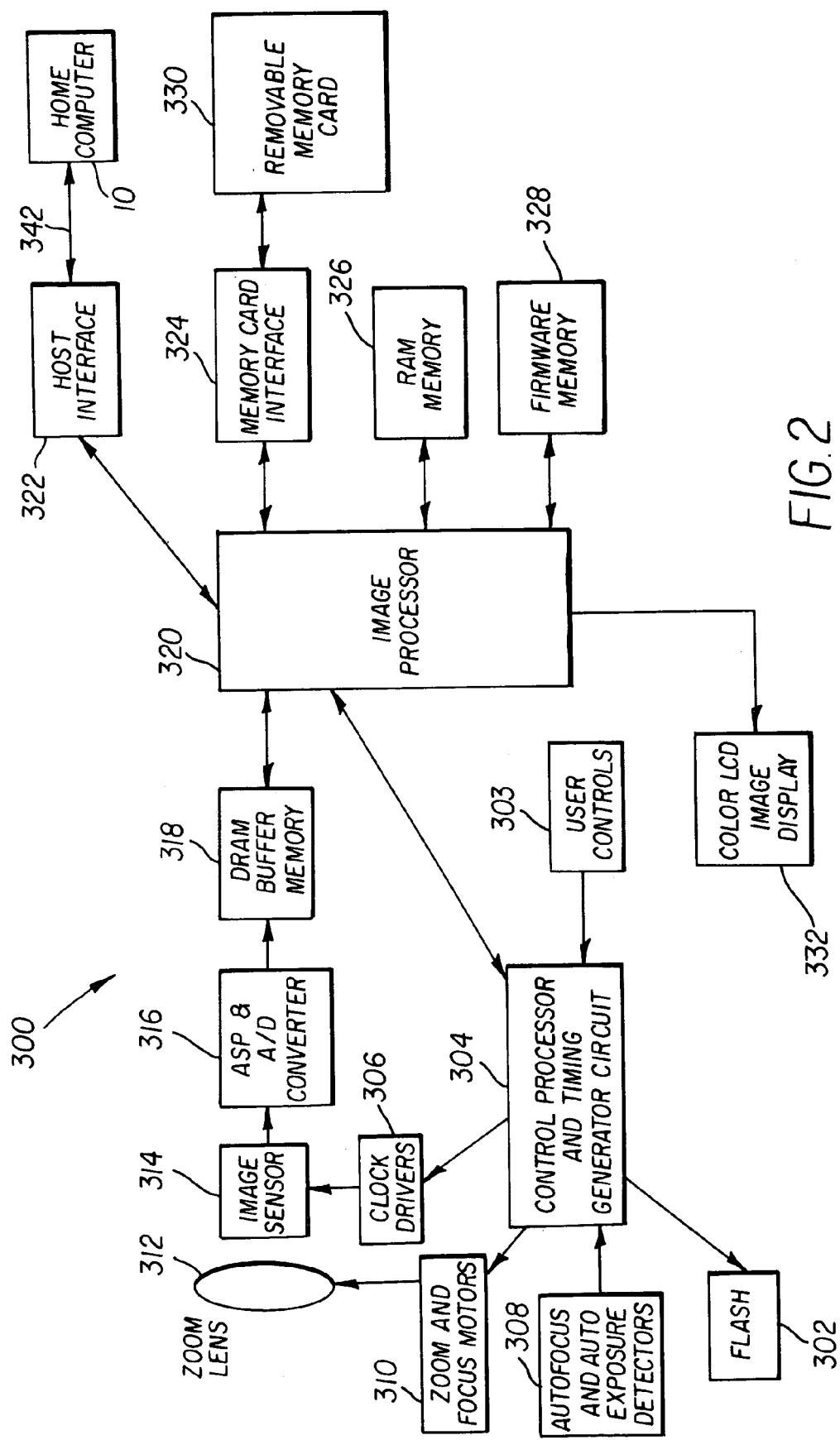
FIG. 2 illustrates in block form the digital camera depicted in FIG. 1.

The digital camera is shown in block diagram form in FIG. 2. The digital camera 300 produces digital images that are stored on the removable memory card 330. The digital camera 300 includes a zoom lens 312 having zoom and focus motor drives 310 and an adjustable aperture and shutter (not shown). The user composes the image using the optical viewfinder (not shown) and the zoom lens control (not shown), and then depresses the shutter button (not shown) to begin capture of a still image. The zoom lens 312 focuses light from a scene (not shown) on an image sensor 314, for example, a single-chip color CCD image sensor, using the well known Bayer color filter pattern. The image sensor 314 is controlled by clock drivers 306. The zoom and focus motors 310 and the clock drivers 306 are controlled by control signals supplied by a control processor and timing generator circuit 304. The control processor and timing generator 304 receives inputs from autofocus and autoexposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by a processor 320 controlled by the firmware stored in the firmware memory 328, which can be flash EPROM memory.

The processed digital image file is provided to a memory card interface 324, which stores the digital image file on the removable memory card 330. Removable memory cards 330 are one type of removable image digital storage medium, and are available in several different physical formats. For example, the removable memory card 330 can include memory cards adapted to the PCMCIA card interface standard, as described in the *PC Card Standard, Release* 2.0, published by the Personal Computer Memory Card International Association, Sunnyvale, Calif., September 1991. The removable memory card 330 can alternatively be adapted to the Compact Flash interface standard, such as described in the *CompactFlash Specification Version* 1.3, published by the CompactFlash Association, Palo Alto, Calif., Aug. 5, 1998, or to the well known SmartMedia, MemoryStick or SD memory card formats. Other types of removable image digital storage media, such as magnetic hard drives, magnetic tape, or optical disks, can alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 330. The JPEG file uses the so-called "Exif" image format defined in "*Digital Still Camera Image File Format (Exif)*" version 2.1, July 1998 by the Japan Electronics Industries Development Association (JEIDA), Tokyo, Japan. This format includes an Exif application segment that stores particular image metadata, for example the date and time the picture was captured, the lens f/number and other camera settings, and image captions or comments that can be selected or entered by the camera user.

The processor 320 also creates a low-resolution "thumbnail" size image, which can be created as described in commonly assigned U.S. Pat. No. 5,164,831 to Kuchta et al., the disclosure of which is herein incorporated by reference. In a preferred embodiment, this thumbnail image has 160× 120 pixels, to conform to the DCF rules described later, and is stored in RAM memory 326 and supplied to the color LCD image display 332.

Figure 3:
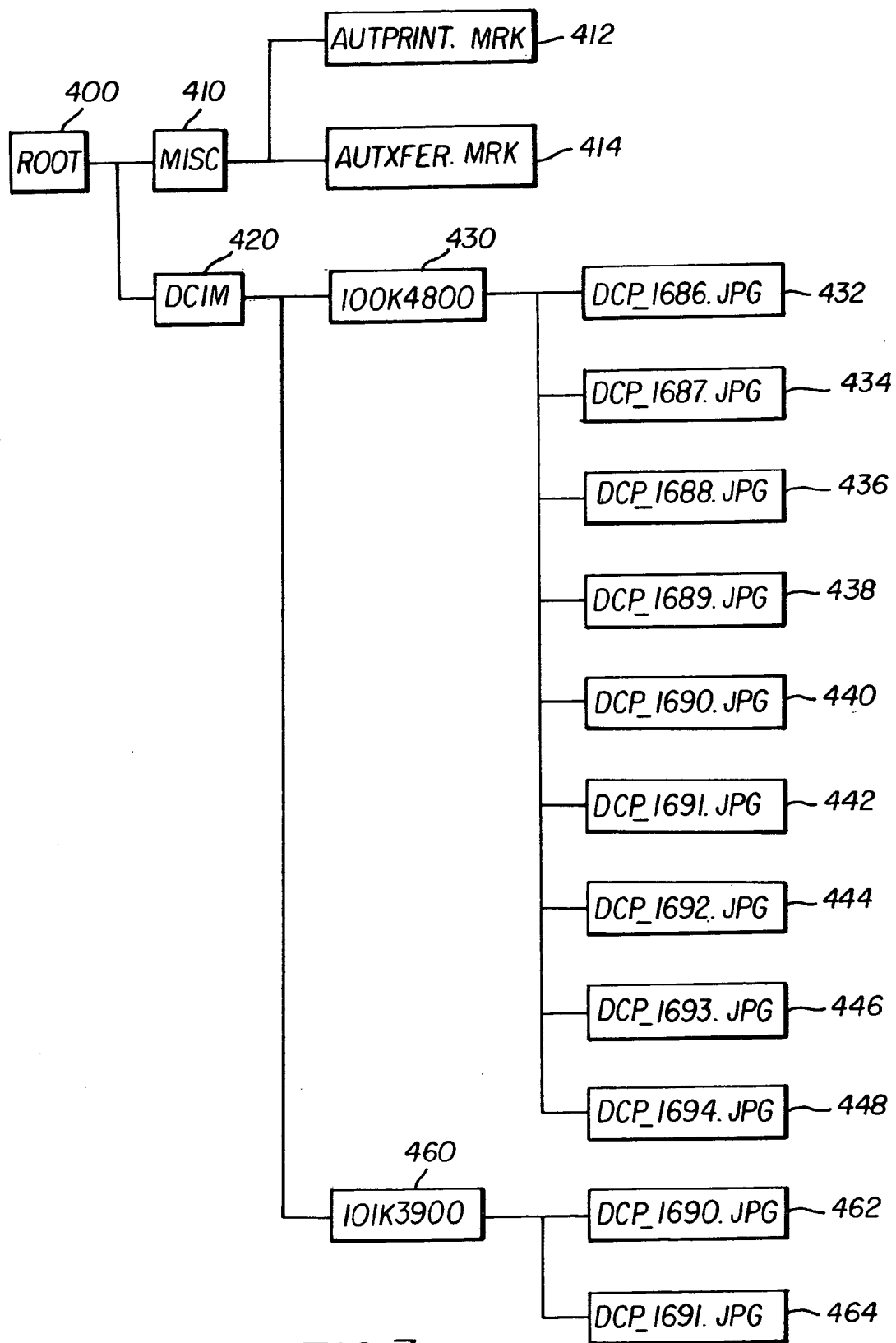
FIG. 3 illustrates a directory structure including image files and control files, stored by the digital camera depicted in FIG. 1.

The Exif image files, containing the JPEG compressed main image, thumbnail image, and the image metadata, are stored on the removable memory card 330 using a directory structure conforming to the so-called "DCF" rules defined in "Design Rule For Camera File System" version 1.0, December 1998 by the Japan Electronics Industries Development Association (JEIDA), Tokyo, Japan. An example directory structure recorded on removable memory card 330 by the camera 300 is depicted in FIG. 3. Two directories are recorded under the root directory 400. The first is a MISC directory 410 containing a control file 412 named AUTPRFNT.MRK and a control file 414 named AUTXFER.MRK. Control files 412 and 414 are DPOF files that specify images to be printed and emailed, as will be described later in reference to FIG. 4A and FIG. 4B.

The second directory recorded under root directory 400 is DCIM directory 420, which contains subdirectories 430 and 460. Subdirectory 430 is named 100K4800, to conform to the DCF rules, and contains nine JPEG compressed Exif image files, file 432 named DCP_1686.JPG, file 434 named DCP_1687.JPG, file 436 named DCP_1688.JPG, file 438 named DCP_1689.JPG, file 440 named DCP_1690.JPG, file 442 named DCP_1691.JPG, file 444 named DCP_1692.JPG, file 446 named DCP_1693.JPG, and file 448 named DCP_1694.JPG. Files 432 through 448 are Exif image files captured by the digital camera 300, which may be for example a Kodak DC4800 digital camera. Subdirectory 460 is named 101K3900, and contains two JPEG, file 462 named DCP_1693.JPG and file 464 named DCP_1694.JPG. Files 462 and 464 are Exif files captured by a second digital camera, such as a Kodak DX 3900 digital camera, using the same removable memory card 330.

The graphical user interface displayed on the color LCD image display 332 is controlled by user controls 303, which may include push buttons, mode dials, joysticks, touch screens, or the like. The digital camera 300 can also include a video output driver and connector (not shown) for displaying the captured images and the graphical user interface on a TV (not shown). In a preferred embodiment, the digital camera 300 includes a mode control (not shown) which provides a "capture" mode and a "review/order" mode. When set in the capture mode, the digital camera captures digital images and stores corresponding image files on the removable memory card 330. When set in the review/order mode, the camera displays thumbnail images from the image files stored on the removable memory card 330, and provides a graphical user interface which enables the user to select images for printing and emailing.

Figure 7A:
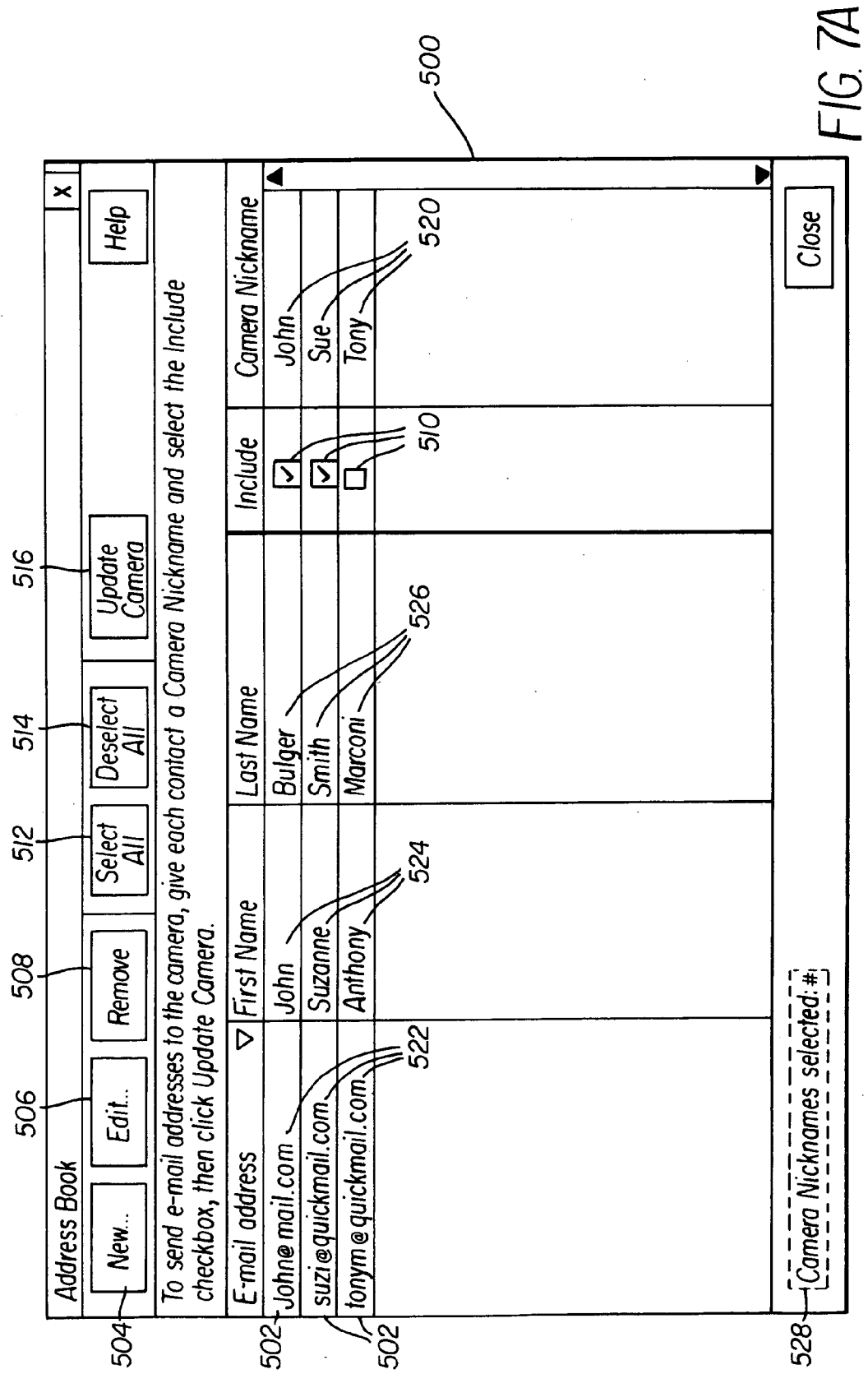
FIG. 7A depicts a graphical user interface used for transferring email addresses to a digital camera.

In the review/order mode, the user can decide which images to print, and how many copies to make. The user can also decide which images to email to one or more recipients. These decisions will later indicate a "prior intention" for subsequent use (e.g. printing or emailing) of the selected stored image files. The printing decisions are recorded in the AUTPRINT.MRK file 412, and the emailing decisions are recorded in the AUTOXFER.MRK file 414, in FIG. 3. Email addresses are created on the home computer 10 and transferred to the digital camera 300 as will be described later in reference to FIG. 7A. The email addresses are stored in the digital camera 300 as described in commonly assigned U.S. patent application Ser. No. 08/977,382, filed Nov. 24, 1997 by Kenneth A. Parulski et al., entitled "Electronic Camera With 'Utilization' Selection Capability", the disclosure of which is herein incorporated by reference.

FIG. 4A is an example of the contents of AUTPRINT.MRK file 412. The file includes a header section (lines 1-4) having a header identifier ("HDR" in line 1), a DPOF version number (01.10 in line 2), the make and model of the digital camera that created the DPOF file (Kodak DC4800 zoom digital camera in line 3), and the time that the DPOF file was created (line 4). The file also includes a plurality of "JOB" sections that indicate an intention to produce a specific number of prints of a specific image file.

For example, lines 5 through 10 correspond to a first job, having product ID 001 (line 6). This first job is to provide a quantity of one (QNT=001 in line 8) standard type print (TYP=STD in line 7) using the Exif file (line 9) which is named DCP_1686.JPG, within subdirectory 100K4800 within directory DCIM (line 10). In other words, this indicates an intention to print one standard size copy of image file 432 in FIG. 3.

Similarly, lines 11 through 16 correspond to a second job, having product ID 002 (line 12). This second job is to provide a quantity of one (QNT=001 in line 14) standard type prints (TYP=STD in line 13) using the Exif file (line 15), which is named DCP_1688.JPG, within subdirectory 100K4800 within directory DCIM (line 16). In other words, this indicates an intention to print one standard size copy of image file 436 in FIG. 3.

Job 3 (lines 18-22) indicates an intention to print two standard size copies of image file 440 in FIG. 3, which is an Exif file named DCP_1690.JPG within folder 430 which is named 100K4800, as indicated by line 22. Job 5 (lines 29-34) indicates an intention to print image file 462, which is an Exif file with the same name, DCP_1690.JPG, but is located within folder 460 which is named 101K3900, as indicated by line 34. Therefore, the AUTPRINT.MRK file 412 listed in FIG. 4A indicates an intention to print similarly named images captured by two different model cameras (e.g: a DC 4800 camera and a DX 3900 camera) and stored on the same memory card 330.

FIG. 4B is an example of the contents of AUTXFER.MRK file 414. This file also includes a header section (lines 1-4) include a header identifier ("HDR" in line 1), a DPOF version number (01.00 in line 2), the make and model of the digital camera that created the DPOF file (Kodak DC4800 zoom digital camera in line 3), and the time that the DPOF file was created (line 4). The file also includes a plurality of "JOB" sections, which indicate an intention to email one or more digital image files to one or more destinations.

For example, lines 5 through 12 correspond to a first job, having product ID 001 (line 6). This first job indicates an intention to email images to two recipients, "john@mail.com" (line 7) and "suzi@quickmail.com" (line 8) using the Exif files (line 9), which are named DCP_1686.JPG (line 10), DCP_1688.JPG (line 11); and DCP_1690.JPG (line 12), within subdirectory 100K4800 within directory DCIM. In other words, this indicates an intention to email image files 432, 436, and 440 in FIG. 3 to the email addresses provided on lines 7 and 8 of FIG. 4B.

Similarly, lines 14 through 20 correspond to a second job, having product ID 002 (line 14). This second job indicates an intention to email image files 440, 442, 462, and 464 (FIG. 3) to the email address "tony@yahoomail.com". (line 15). Job 3 (lines 22-25) indicates an intention to email image file 464 to the email address "bill@abc.com". Therefore, the AUTFER.MRK file 414 listed in FIG. 4B indicates an intention to email similarly named images captured by two different model cameras (e.g. a DC 4800 camera and a DX 3900 camera) and stored on the same memory card 330.

As shown in FIG. 1 and FIG. 2, an interface cable 342 can be used to connect between the host interface 322 in the electronic camera 300 and a corresponding camera interface (not shown) in the home computer 10. The interface cable 342 may conform to, for example, the well known universal serial bus (USB) interface specification. The interface cable 342 can be used to download images from removable memory card 330 to home computer 10, instead of using card reader 24 (FIG. 1). The interface cable 342 can also be used to transfer data from home computer 10 to firmware memory 328 in camera 12. In particular, it can be used to transfer email addresses from home computer 10 to firmware memory 328, as described in previously cited U.S. patent application Ser. No. 08/977,382, filed Nov. 24, 1997 by Kenneth A. Parulski et al., the disclosure of which is herein incorporated by reference.

Optionally, an intention to obtain other types of products, such as a Picture CD, photo albums, mugs, t-shirts, etc. may be provided using digital camera 330, by uploading the appropriate product information from home computer 10 (which may be provided from the electronic database 44 of the photo service provider 40 shown in FIG. 1) to firmware memory 328, or alternatively by storing the appropriate product information on removable memory card 330.

Figure 5:
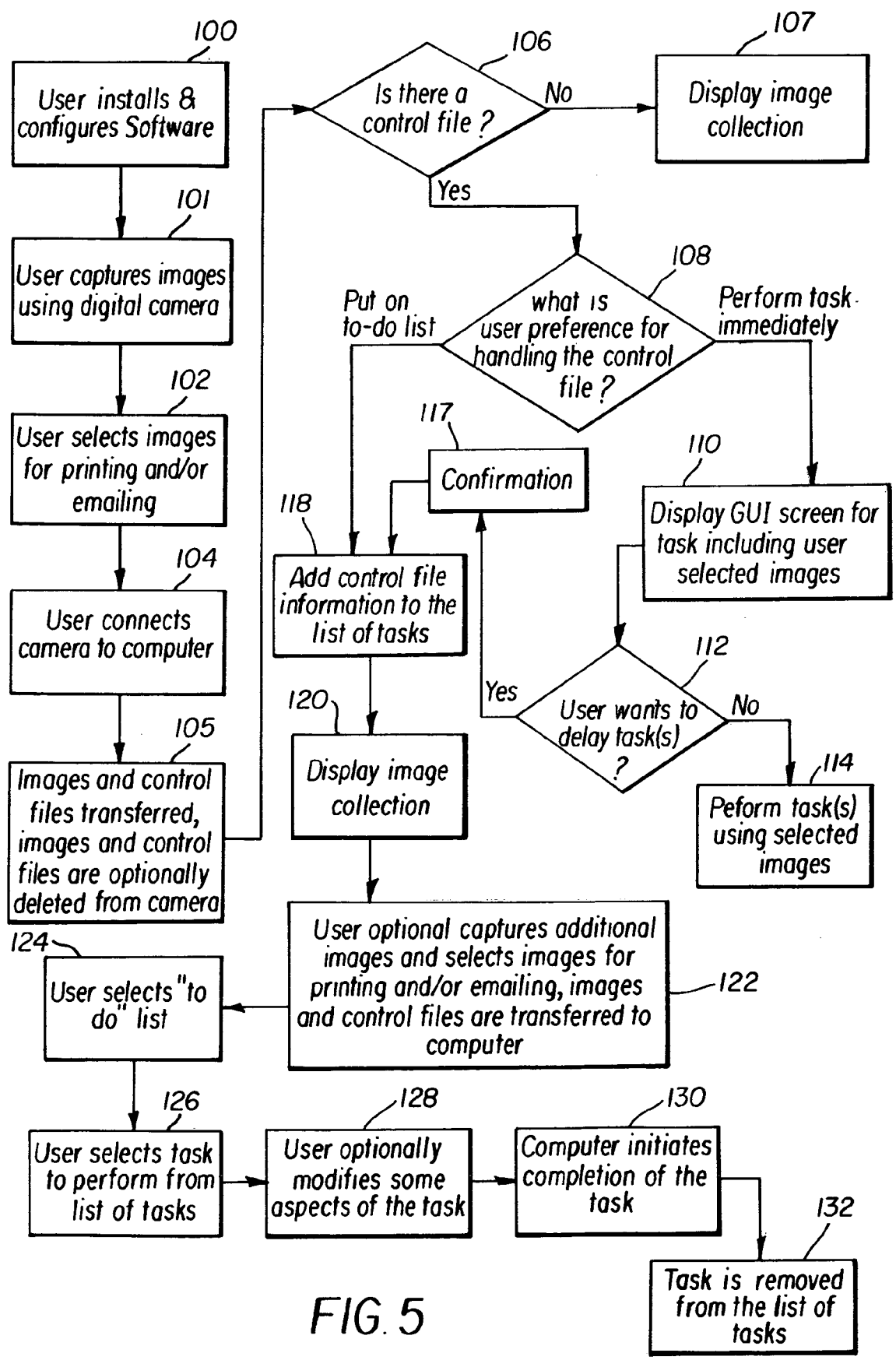
FIG. 5 is a flow chart illustrating the method of operation of the system of FIG. 1.

The methods of the present invention will now be described in reference to FIG. 5. FIG. 5 depicts a flow chart illustrating the method of operation of the system of FIG. 1. In block 100, the user installs the software that implements the methods of this invention on the home computer 10. As one step in the software installation, the user is asked to select whether, when downloading images to the home computer 10, to immediately perform the intended tasks provided in control files created by the digital camera 300, or alternatively to have the home computer 10 automatically convert the control files to one or more work orders, which are displayed as a list of selectable tasks, known as a "To Do " list (which will be described later in reference to FIG. 6). This preference is stored and used as will be described later in reference to block 108 of FIG. 5.

As an additional step in the software installation, the user is asked if they wish to transfer email addresses from an address book of the home computer 10 to the address book of the digital camera 300. If the user wants to transfer email addresses, the home computer 10 displays the "address book" graphical user interface (GUI) screen 500 shown in FIG. 7A on the display monitor 14 of home computer 10. The address book GUI screen 500 includes rows of entries 502, with each entry including a camera nickname 520 (e.g. "John") and an email address 522 (john@mail.com), as well as a first name 524 and a last name 526. The user can add new entries using "new" button 504, edit existing entries using "edit" button 506, and remove entries using "remove" button 508.

To transfer entries to the digital camera 300, the user can select individual entries using the check boxes 510. The user can also select all of the entries using the "select all" button 512, or deselect all of the currently selected checkboxes using the "deselect all" button 514. The number of entries currently selected is displayed in text box 528. After selecting the desired email address entries, the user clicks on the "Update camera" button 516 in order to transfer the entries to the firmware memory 328 of the digital camera 300, as was described earlier in relation to FIG. 2.

In block 101, digital images are captured using the digital camera 300 and stored as digital image files on the removable memory card 330. In block 102, the user indicates an intention to utilize one or more of the stored digital image files, by selecting images for printing or emailing. In response, the camera 300 produces one or more DPOF files, such as the AUTPRINT.MRK file of FIG. 4A and the AUTXFER.MRK file of FIG. 4B, as was described earlier.

In block 104, the user connects the camera 300 to the home computer 10 using interface cable 342. Alternatively, the user can remove the removable memory card 330 from the digital camera 300 and place the removable memory card 330 in the card reader 24. When the digital camera 300 is electrically connected to the home computer 10, the host computer detects the connection. For example, a USB host controller circuit in home computer 10 can detect that a new USB peripheral device has been connected to the USB bus. In response, the home computer 10 displays the transfer GUI screen 540, shown in FIG. 7B, on the display monitor 14 shown in FIG. 1. The transfer GUI screen 540 enables the user to make selections related to transferring images from the digital camera 300 to the home computer 10. These selections include transferring images "all at once" using radio button 542. This can include selecting "one touch" transfer (checkbox 544) which automatically transfers the images (the next time new images are to be transferred) without displaying the transfer GUI screen 540. These selections also include transferring images "one at a time" using radio button 546.

Transfer GUI screen 540 also enables the user to select a particular folder that will be used to store the images in the memory (e.g. hard drive 20) associated with the home computer 10. The folder is selected using text box 548, and by default is the date the images are transferred. The user can overwrite the date with a different folder name, or select a name from a list, using pull down arrow icon 549. The user can select to rename the images using checkbox 550, and can enter a name for the image (such as "Florida_vacation") using text box 552, or can select a name from a list using pull down arrow icon 553. If the user has selected to rename the images as they are transferred, the image files 432-448 in FIG. 3 (DCP_1686.JPG, DCP_1687, etc.) will be renamed, with a sequence number appended at the end (e.g. Florida_vacation_0001, Florida_vacation_0002, etc.) and stored in the user-selected folder (e.g. a folder named 2001-06-19 within the C:\Kodak_Pictures directory).

If the user selects checkbox 554 "Remove original pictures from device", the digital image files (e.g. Files 432-448 and 462-464 in FIG. 3) will be deleted from the removable memory card 330 after they are transferred to the hard drive 20. If the user selects checkbox 556 "protect pictures on computer", the transferred files will be stored as read-only files on the hard drive 20. After making the desired selections, the user selects "transfer" button 558 to initiate transfer of the image files and control files from the digital camera 300 to the home computer 10.

In block 105, in response to the user selecting the "transfer" button 558, the home computer 10 reads the digital images (e.g. image files 432-448 and 462-464 in FIG. 3) and stores these files on the hard drive 20 in the user-selected folder, using the user-selected naming convention. The home computer also reads the control files created in block 102 (e.g. files 412 and 414 in FIG. 3) and stores information that indicates the user's prior intention for subsequent use of the transferred images. This information can be the control files themselves (e.g. DPOF files), or alternatively can be modified versions of the control files. In other embodiments, this information can be stored as part of a database of objects including "work order" objects, with each "work order" object corresponding to one or more job sections of the control files shown in FIG. 4A and FIG. 4B.

In one preferred embodiment, the control files are modified as they are transferred from the digital camera 300 to the home computer 10 so that the names and storage locations of the user-selected image files reflect the new names and storage locations of the corresponding transferred image files. For example, in line 10 of FIG. 4A, if the image DCP_1686 is renamed as Florida_vacation_0001 and stored in the C:\Kodak_Pictures\2001-06-19 directory (folder) on the hard drive 20, line 10 of this control file would be modified to <IMG SRC=./Kodak_Pictures/2001-06-19/Florida_vacation_0001.

In addition, if the email control file 414 (AUTXFER.MRK) includes more than one job section, each job section is stored in a new, separate control file on the hard drive 20. In the example of FIG. 4B, the three jobs are separated into three email control files, all with the same header information (lines 1-4 of FIG. 4B) but with different job control information. The first new control file includes the control information in lines 5-12 of FIG. 4B, the second new control file includes the information in lines 13-20 of FIG. 4B, and the third new control file includes the information in lines 21-25 of FIG. 4B. The new control files are named AUTXFER_1.MRK, AUTXFER_2.MRK, and AUTXFER_3.MRK.

After the transfer is complete, if the user previously selected the "remove original pictures from the device" checkbox 554, the image files (432-448 and 462-464 in FIG. 3) and the control files (412 and 414 in FIG. 3) are deleted from the removable memory card 330.

Figure 7B:
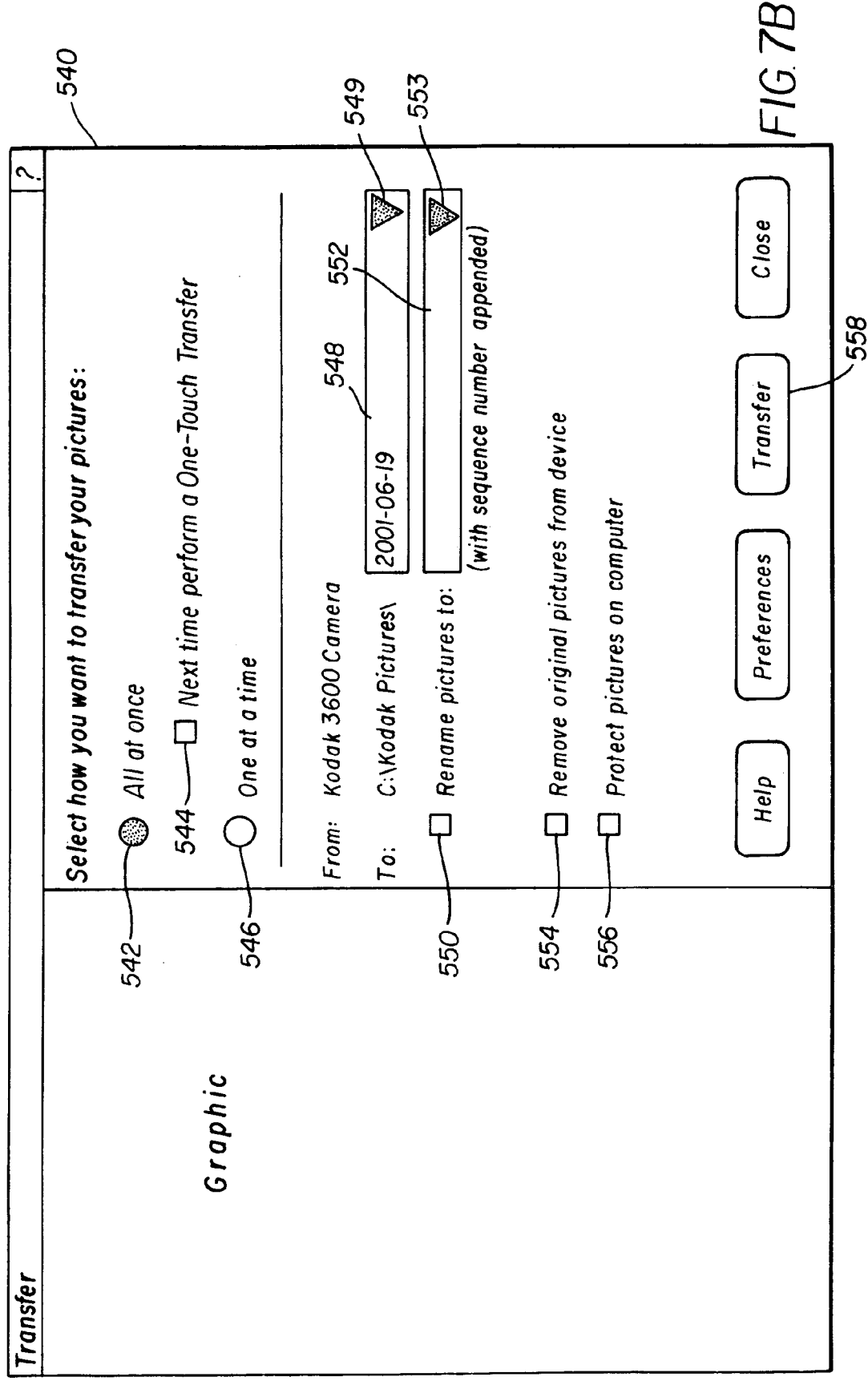
FIG. 7B depicts a graphical user interface used for transferring images and control files from a digital camera to a computer.

It should be noted that if the user selected "one touch" transfer checkbox 544 in FIG. 7B during a previous transfer, the image files are automatically transferred when the digital camera 300 is connected to the home computer 10 and turned on. In this case, the GUI screen 540 in FIG. 7B is not displayed.

In block 106, the home computer 10 examines the stored digital files to determine whether one or more control files (e.g. files 412 or 414 in FIG. 3) were transferred. In block 107, if no control files were transferred, (e.g. if the user did not select any images for printing or emailing in block 102), the home computer 10 displays an image collection GUI screen, as will be described later in reference to block 120 of FIG. 5, and FIG. 7F.

In block 108, if one or more control files have been transferred, the home computer 10 detects the user preference for handling these control files, which was selected by the user in block 100.

In block 110, if the user preference was to perform tasks indicated in the control files immediately, the home computer 10 enables the intended tasks to be immediately initiated, by providing an appropriate user interface screen indicating the images that are about to be printed and/or emailed.

Figure 7C:
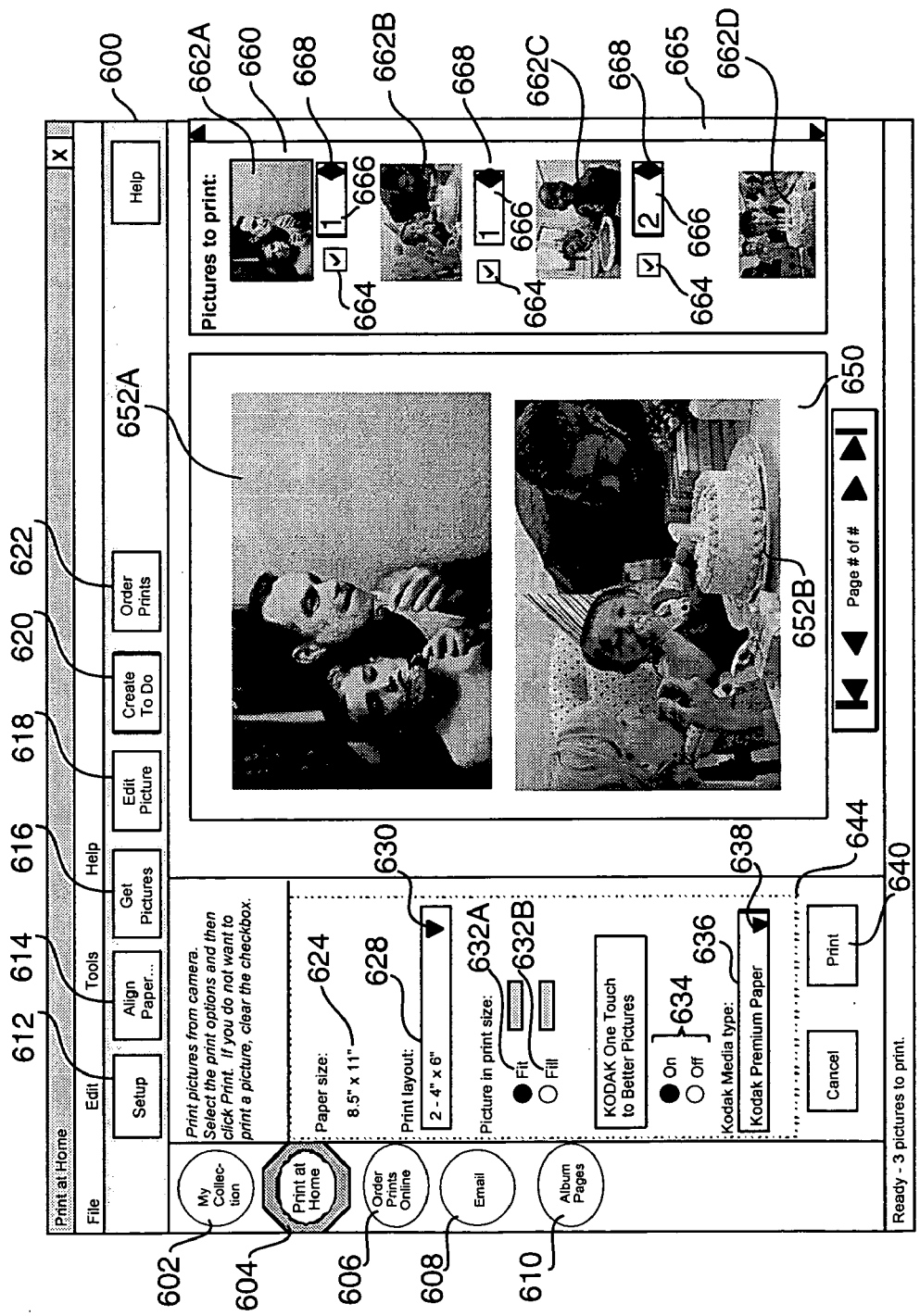
FIG. 7C depicts a graphical user interface used for a print task.

If the tasks include printing images, the home computer 10 displays a print GUI screen 600 shown in FIG. 7C on the display monitor 14. The print GUI screen 600 includes thumbnail display area 660, which includes thumbnail images 662A, 662B, 662C, and 662D of the images selected for printing by the user in block 102 (e.g. images DCP_1686.JPG, DCP_1688.JPG, etc). The thumbnail display area 660 also includes a slider 665, for scrolling through the vertical displayed group of thumbnail images. The thumbnail display area 660 also includes checkboxes 664 for selecting or deselecting images to be printed, and a text box 666 which indicates the quantity of prints to be made of each particular image, as selected by the user in block 102. The user can modify the quantity of images to be printed by using the up/down arrows 668 adjacent each text box 666, or by typing in a new value into text box 666. This enables the user to modify a task that was included in the print control file.

The print GUI screen 600 includes a print options area 644. The print options area 644 includes a paper size text display 624, a print layout text box 628 and pull-down arrow icon 630, to enable the user to select a desired print layout (e.g.2—4"×6" pictures on one page). The print options area 644 also includes radio buttons 632A and 632B. When radio button 632A is selected, the image is entirely displayed on the print size, even if white space must be included. When radio button 632B is selected, the image fills the print size with the image (e.g. crops the image if needed to correct the aspect ratio). The print options area also includes on/off radio buttons 634 for controlling "one-touch" color management processing, and a paper type text box 636 and pull-down arrow icon 638 for selecting the type of paper to be used for printing.

The print GUI screen 600 includes a print preview window 650, which displays the images as they are currently configured for printing. In the example of FIG. 7C, two 4"×6" sized images, 652A and 652B, on an 8"×11" size sheet, are displayed in print preview window 650.

The print GUI screen 600 includes tabs 602-610 for selecting other GUI screens. Tab 602 selects the "collection" GUI screen, tab 604 selects the (current) print GUI screen, tab 606 selects the "order prints online" GUI screen, tab 608 selects the "email" GUI screen, and tab 610 selects the "memory albums" GUI screen. The print GUI screen 600 also includes "Setup" icon 612, for setting other printer parameters, "Align paper" icon 614 for aligning the paper in the printer, "Get pictures" icon 616, for adding new pictures to be printed to the thumbnail display area 660, and an "Edit Picture" icon 618, for modifying (e.g. cropping, lightening) one or more of the images in the thumbnail display area 660.

Figure 7D:
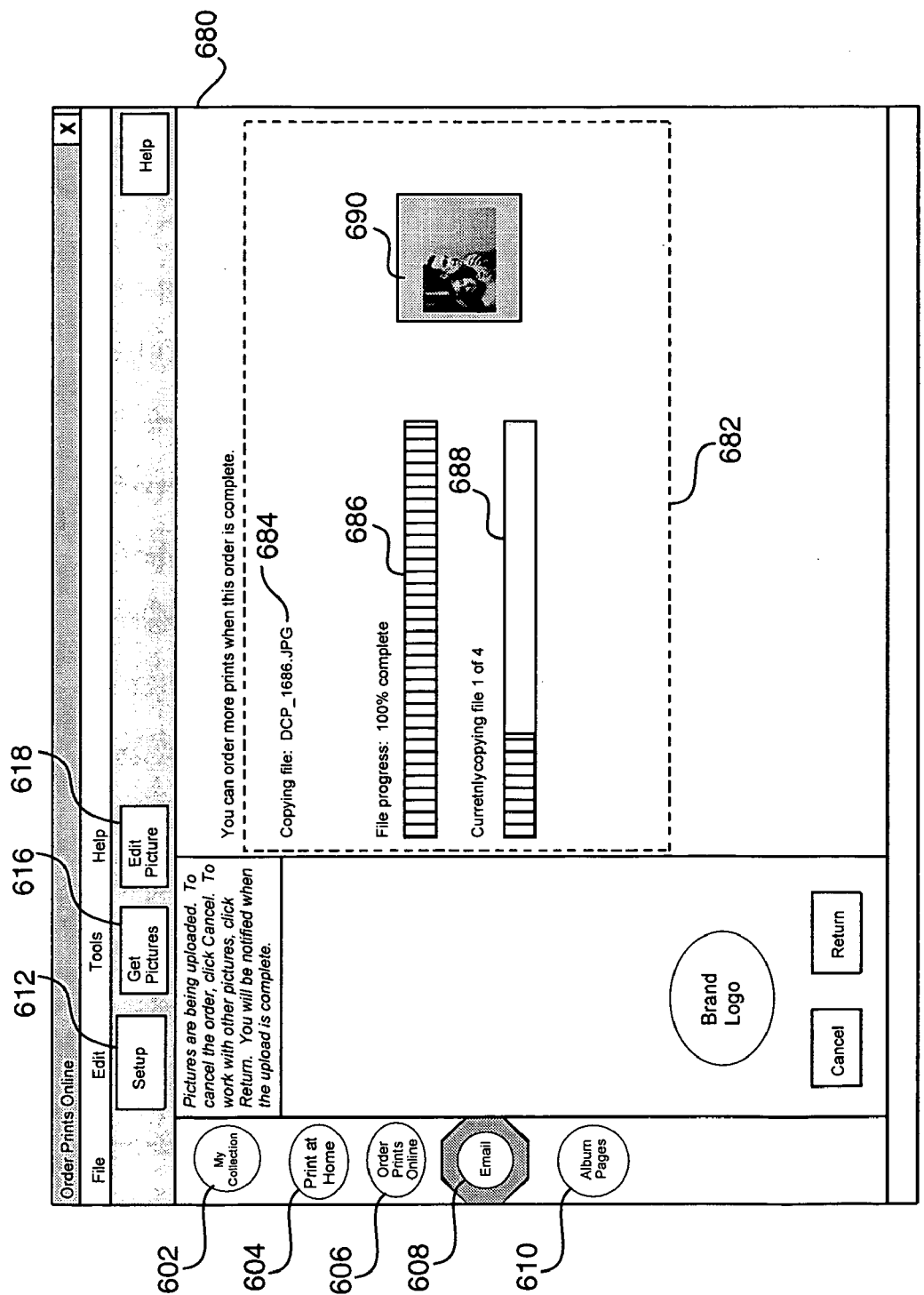
FIG. 7D depicts a graphical user interface used for uploading images to a service provider.

The user can print the selected quantity of images shown in the thumbnail display area 660 on the printer 26 (FIG. 1) by selecting the print button 640. In this case, the home computer 10 controls the printer 26 to produce the size and number of images provided in the current task. Alternatively, the user can buy prints from the photo service provider 40, by selecting the "Order prints" icon 622. In this case, the home computer 10 displays the "order prints" GUI screen 680 shown in FIG. 7D on the display monitor 14. The "order prints" GUI screen 680 includes an "upload progress" area 682, which includes a text display 684 showing the name of the current file being uploaded, a file progress bar 686 showing the "percent complete" progress in uploading the current file, a thumbnail image 690 of the current file being uploaded, and a task progress bar 688 showing the "percent complete" progress in uploading all of the files to be printed.

In block 112 of FIG. 5, the user can delay the tasks provided in the control files. The printer GUI screen 600 (FIG. 7C) includes a "create To Do" icon 620. If the user selects icon 620 instead of "print" button 640 or "order prints" icon 604, the printing task will not be done immediately. In block 117 of FIG. 5, the user is presented with a confirmation (FIG. 7G). The confirmation GUI screen 760A provides a text message 762A about what information will be saved as the To Do task. The user may elect to continue with creating the To Do task by clicking the OK button 764A. Then the control file information (which may have been modified by the user as described earlier) will be added to the "To Do" list tasks in block 118. From the confirmation GUI screen 760A, the user may return to the print GUI screen 600 (FIG. 7C) by clicking the Cancel button 766A. If, however, the user does not select icon 620, but instead selects the print button 640 the printing task will be completed using the selected images (block 114) as described earlier.

Figure 7E:
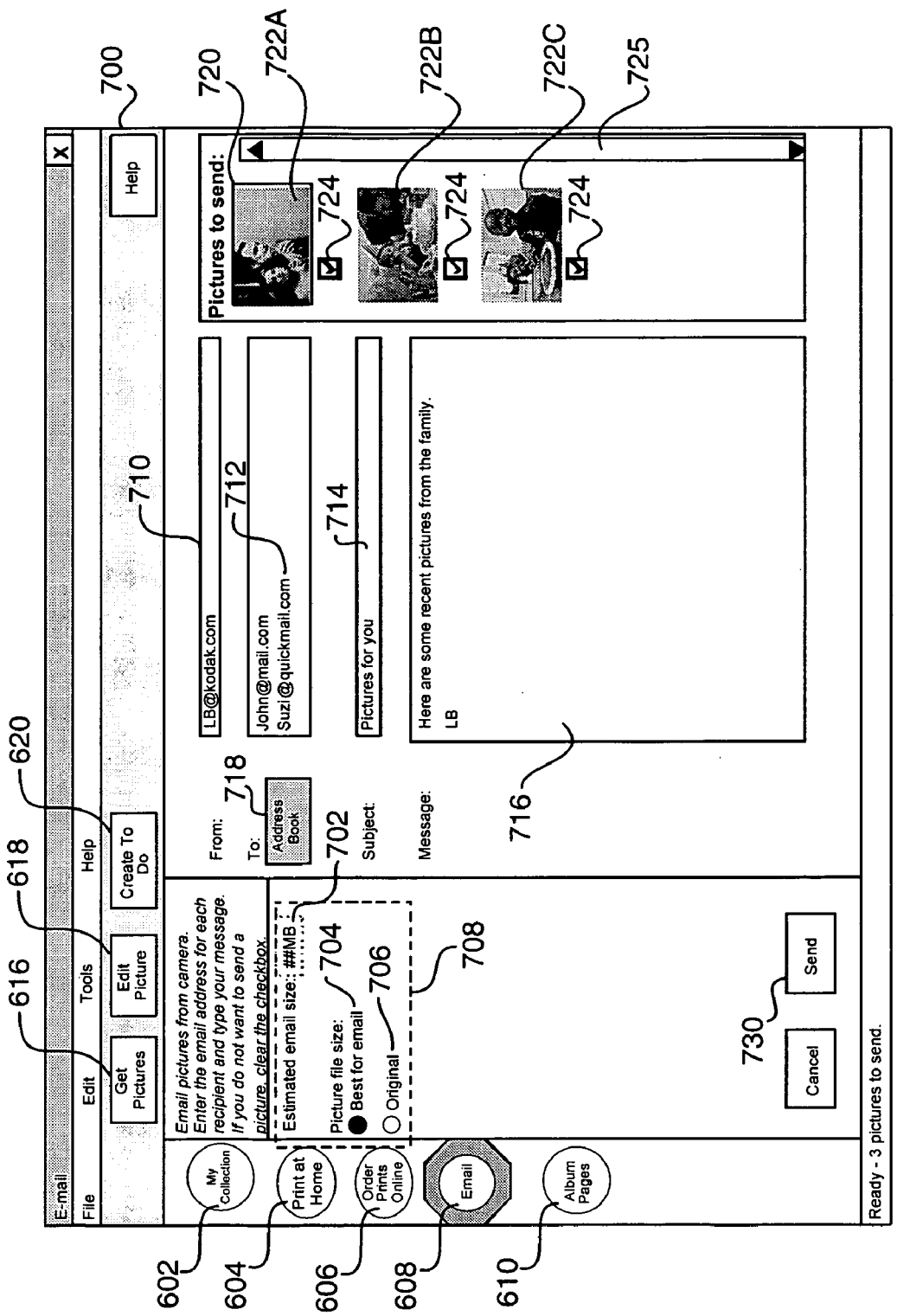
FIG. 7E depicts a graphical user interface used for an email task.

In block 110 of FIG. 5, if the user selected images for emailing in block 102, the home computer 10 displays the "email" GUI screen 700 shown in FIG. 7E on the display monitor 14. The email GUI screen 700 includes thumbnail display area 720, which includes thumbnail images 722A, 722B, and 722C of the images selected for emailing by the user in block 102 (e.g. images DCP_1686.JPG, DCP_1688.JPG, and DCP_1690). The thumbnail display area 720 also includes a slider 725, for scrolling through the vertical displayed group of thumbnail images. The thumbnail display area 720 also includes checkboxes 724 for selecting or deselecting images to be emailed. The user can deselect images to be emailed using the checkboxes 724, and can add new images to be emailed using the "get pictures" icon 616. This enables the user to modify a task that was included in the email control file.

The email GUI screen 700 also includes "from" text box 710, which provides the users email address (e.g. LB@kodak.com) and a "to" text box 712, which is automatically populated from the email addresses provided in the email control file, such as the example shown in FIG. 4B. The entries in the "to" text box can be modified deleting email addresses, or by adding new entries from the user's address book, using the "address book" button 718. This enables the user to modify a task that was included in the email control file. The email GUI screen 700 also includes a subject text box 714, and a message text box 716. The email GUI screen 700 also includes an image size selection area 708 which displays the estimated email size text display 702, and radio buttons 704 and 706 for selecting "Best for email" (reduced) size image files or original size image files. When the user selects the "send" button 730, the user-selected images are sent to the email addresses shown in "to" text box 712, via Internet Service Provider 30 (FIG. 1).

In block 112 of FIG. 5, the user can delay the task of emailing the images shown in the thumbnail display area 720, by selecting the "create To Do" icon 620. If the user selects icon 620 instead of "send" button 730, the control file information (which may have been modified by the user as described earlier) will be added to the "To Do" list tasks in block 118. In block 117 of FIG. 5, the user is presented with a confirmation (FIG. 7G). The confirmation GUI screen 760B provides a text message 762B about what information will be saved as the To Do task. The user may elect to continue with creating the To Do task by clicking the OK button 764B. Then the control file information (which may have been modified by the user as described earlier) will be added to the "To Do " list tasks in block 118. From the confirmation GUI screen 760B, the user may return to the email GUI screen 700 (FIG. 7E) by clicking the Cancel button 766B. If the user instead selects the "send" button in block 112, the home computer 10 immediately emails the images using the selected images in block 114.

In block 118, if the user preference determined in block 108 was to put the control file information on the "To Do " list, or if the user elects to delay the tasks (block 112), the control file or files are converted into tasks on the "To Do" list (block 120).

Figure 7F:
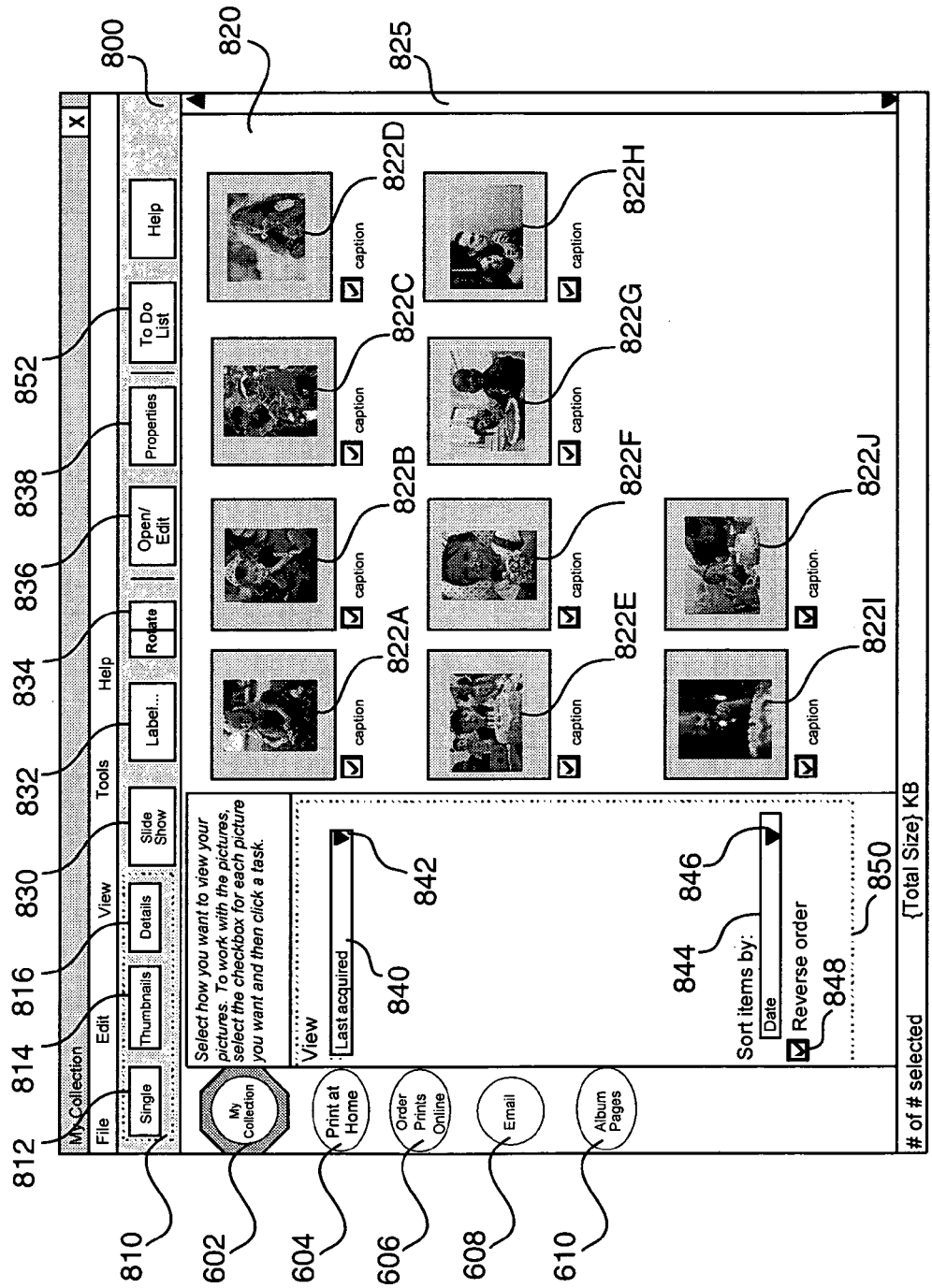
FIG. 7F depicts a graphical user interface used for selecting the "To Do" list.
Figure 7G:
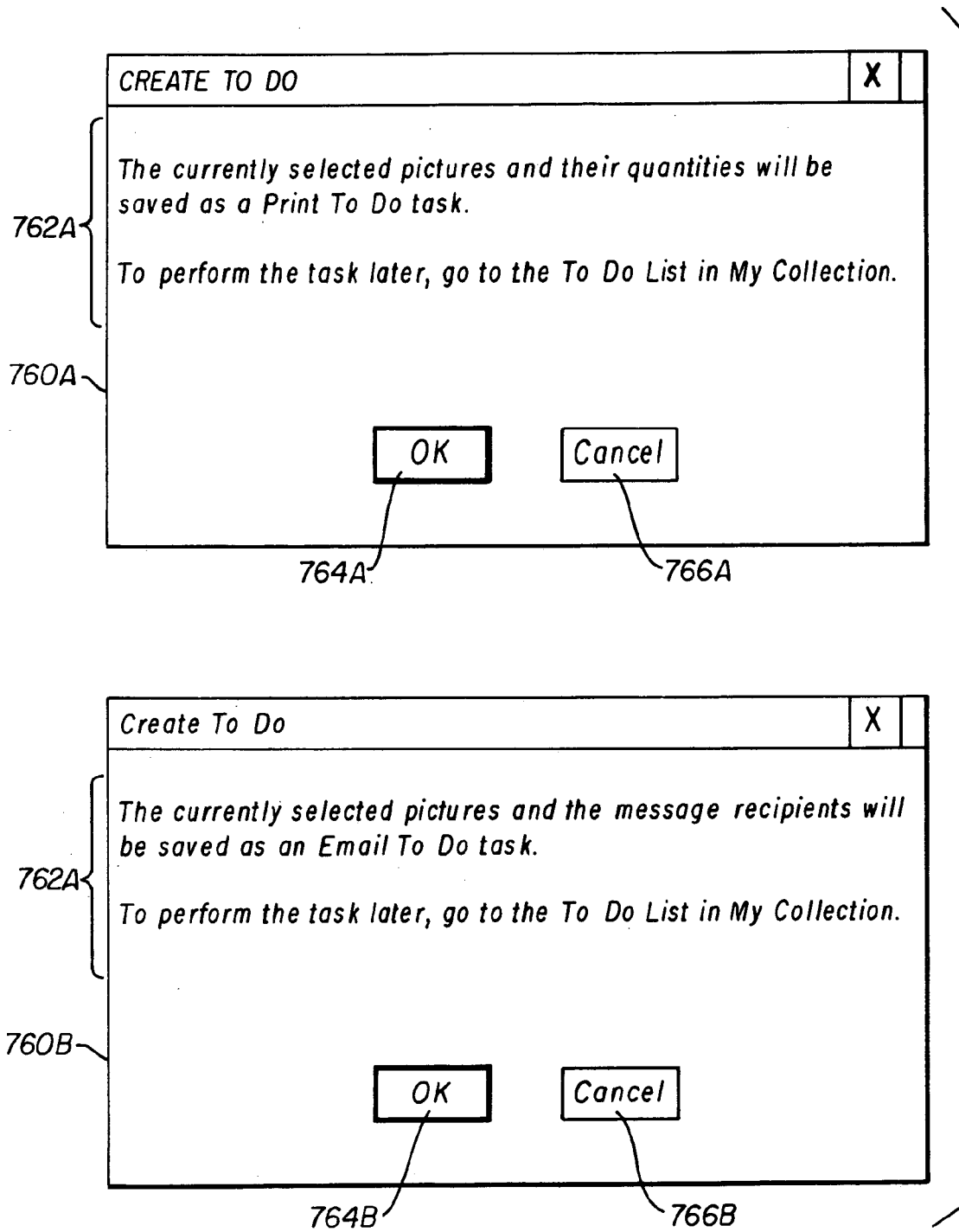
FIG. 7G depicts a graphical user interface for confirming that a task should be added to the "To Do " list.

In block 120, the home computer 10 displays the "collection" GUI screen 800 shown in FIG. 7F on the display monitor 14. The collection GUI screen 800 includes a display selection area 810, which provides three types of displays. A "thumbnails" display icon 814 displays an array of thumbnails in the image display area 820, as shown in the example of FIG. 7F. Alternatively, a "single" display icon 812 can be selected by the user in order to display a single image at a time in the image display area 820, or a "details" display icon 816 can be selected by the user in order to display thumbnails and other information, (including the date the image was taken, picture labels, and the like) in the image display area 820. Since the "thumbnails" display mode has been selected in FIG. 7F, a group of thumbnail images 822A-822J are displayed in the image display area 820. A slider 825 is used for scrolling through the collection of thumbnail images.

Beneath each thumbnail image is a selection checkbox, which can be used to select a group of images. For example, images can be selected for use in a slide show, which is initiated by selecting slide show icon 830. One or more images can also be labeled with key words using the "label" icon 832. The keywords can indicate the event or subject of the picture, for example. Selected images can be rotated by selecting "rotate" icon 834 or edited by selecting "open/edit" icon 836. Information contained in a selected Exif image file (such as the date/time, camera settings and the like), as well as the keywords, can be viewed by selecting the "properties" icon 838.

The collection GUI screen 800 includes a view/sort options area 850. The view options are selected using a view text box 840 and a pull-down arrow icon 842, to enable the user to view all of the images, only the last acquired images, or only the images that meet the search criterion. The sort options are selected using a sort items text box 844 and a pull-down arrow icon 846 to select a desired sort option from a list, including sort by date, caption, or keyword. A reverse order checkbox 848 is used to reverse the display. The collection GUI screen 800 also includes tabs 602-610 for selecting other GUI screens. Tab 602 selects the "collection" (current) GUI screen, tab 604 selects the print GUI screen, tab 606 selects the "order prints online" GUI screen, tab 608 selects the "email" GUI screen, and tab 610 selects the "album pages" GUI screen.

The collection GUI screen 800 also includes a "To Do " list icon 852. In block 124, when the user selects the "To Do list" icon 852, the "To Do " list is displayed as a list of tasks, as will be described in reference to blocks 126-128.

In block 122, the user optionally captures additional images using the digital camera 300, and selects some of these additional images for printing or mailing, as was described earlier in reference to blocks 101-102. Prior to capturing new images, the user can delete previously captured images and control files, if they were not automatically deleted in block 105. The user again connects the digital camera 300 to the home computer 10 and the images and control files are transferred, as was described earlier in reference to blocks 104-105. As a result, the "To Do " list may include tasks from numerous control files that were produced over a period of time. During the transfer process, the control files are renamed if necessary, in order to eliminate any naming conflicts with previously stored control files.

Figure 6:
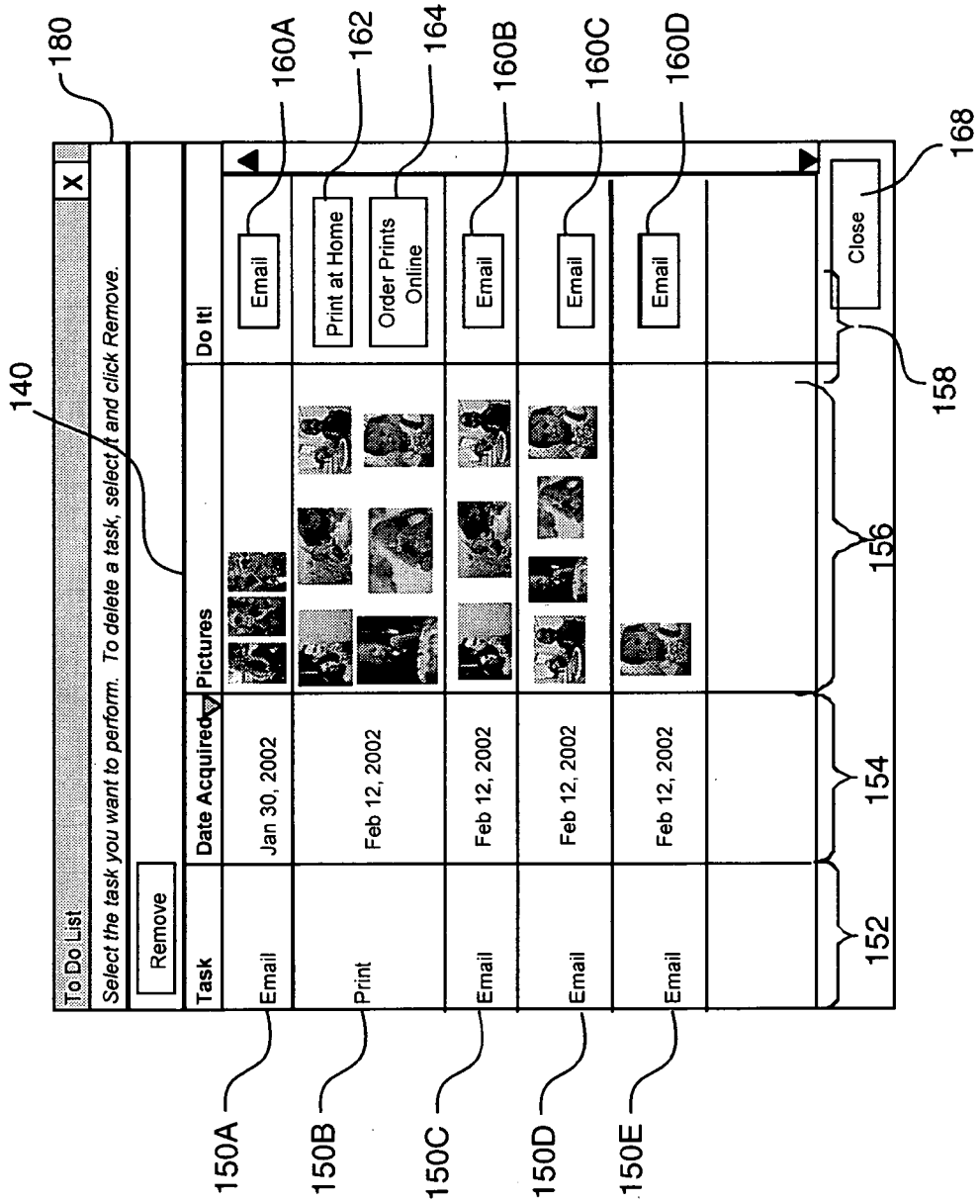
FIG. 6 is a user interface diagram depicting a "To Do" list.

In block 124, at some convenient time, the user may open the "To Do" List, for example by selecting "To Do list" icon 620 in FIG. 7F. In response the home computer 10 displays the "To Do list" GUI screen 180 shown in FIG. 6 on the display monitor 14. The "To Do list" GUI screen 180 includes a list of tasks 140 that are selectable by the user. The list of tasks 140 directly relate to the tasks provided by the control files transferred during block 105, which indicate a prior intention for subsequent use of images selected by the user. The list of tasks 140 presents each task as rows 150A-150E, which could be considered as a single "work order". FIG. 6 depicts a total of five tasks in rows 150A-150E. Information associated with each task is displayed within four columns. A first column 152 displays the type of task to be performed (e.g. printing or emailing). A second column 154 displays the date that the digital images and control files were transferred to the computer 102. A third column 156 displays thumbnail images of the selected images to be used to perform the tasks. In a preferred embodiment, these thumbnail images are provided using the thumbnail image data stored within the Exif image files, as described earlier in relation to FIG. 2. A fourth column 158 contains one or more buttons 160A-D, 162 and 164. These buttons enable the user to select a particular task to perform, from the list of tasks 140.

Note that the list of tasks 140 includes an email task in column 150A that was acquired at an earlier time (e.g. Jan. 30, 2002), a print task in column 150B corresponding to the print control file depicted in FIG. 4A, and three email tasks corresponding to the three jobs within the single email control file depicted in FIG. 4B. Therefore, the list of tasks can include tasks transferred at various times, and can include multiple tasks provided by a single control file. One of the advantages of converting a single email control file into multiple tasks is that this enables the individual email tasks to be easily visualized using thumbnails, and modified by the user if desired.

In block 126, the user selects one of the buttons 160A-D, 162, or 164. If the user selects email button 160A, the "To Do list" GUI screen 180 closes and the email GUI screen 700 is displayed and utilized, as was described earlier in relation to FIG. 7E. The three image files shown in row 150C and column 156 are then displayed in the thumbnail image area 720 of the email GUI screen 700. In block 128, the user can modify the selected email task, by deselecting one or more of these three images, by selecting new images, or by changing the list of recipients, as was described earlier in relation to FIG. 7E. In block 130, the user then selects the "send" button 730 in FIG. 7E. In response, the home computer 10 initiates emailing of the images, as was described earlier. In block 132, the task (e.g. the task shown in column 150A in FIG. 6) is deleted from the list of tasks 140 in FIG. 6.

There are four remaining tasks, so the next time the user opens the "To Do list" GUI screen 180 (FIG. 6), an updated version of the "To Do" list is displayed in block 126. The user can then select another task to perform. For example, the user may select the print button 162, or the order prints online button 164, in order to select task 150A from the list of tasks 140. If the user selects the print button 162, the print GUI screen 700 is displayed and utilized, as was described earlier in relation to FIG. 7C. The six image files shown in row 150B and column 156 are then displayed in the thumbnail image area 660 of the print GUI screen 600 in FIG. 7C. In block 128, the user can modify the selected print task, by deselecting one or more of these six images, by selecting new images, or by changing the number of prints for one or more images, as was described earlier in relation to FIG. 7C. In block 130, the user then selects the "print" button 640 in FIG. 7C. In response, the home computer 10 initiates printing of the images, as was described earlier. In block 132, the task (e.g. the task shown in column 150B in FIG. 6) is deleted from the list of tasks 140 in FIG. 6. If the user had instead selected the order prints online button 164, instead of the print button 162, the order prints GUI screen 680 would be displayed and utilized, as described earlier in relation to FIG. 7D. The "To Do list" GUI screen 180 in FIG. 6 also includes a "close" button 168, which the user can select in order to return to the "collections" GUI screen 800 in FIG. 7F, to delay completion of some tasks until a later date.

A computer program product, such as a readable storage medium, can store the programs in accordance with the present invention for operating the methods set forth above. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the scope of the invention. The present invention being defined the claims that follow.

PARTS LIST

| | |
|---|---|
| 10 | home computer |
| 12 | CPU motherboard |
| 14 | display monitor |
| 16 | keyboard |
| 18 | mouse |
| 20 | hard drive |
| 22 | modem |
| 24 | card reader |
| 26 | printer |
| 30 | Internet service provider |
| 32 | modems |
| 34 | computers/routers |
| 36 | channel |
| 40 | photo service provider |
| 42 | Internet server |
| 44 | electronic database |
| 46 | billing system |
| 48 | bill issuing |
| 50 | fulfillment system |
| 52 | production controller |
| 54 | color printer |
| 66 | photoproduct |
| 70 | shipping system |
| 72 | shipping label printer |
| 74 | shipping label |
| 76 | CD writer |
| 100 | block |
| 101 | block |
| 102 | block |
| 104 | block |

-continued

PARTS LIST

| | |
|---|---|
| 105 | block |
| 106 | block |
| 107 | block |
| 108 | block |
| 110 | block |
| 112 | block |
| 114 | block |
| 117 | block |
| 118 | block |
| 120 | block |
| 122 | block |
| 124 | block |
| 126 | block |
| 128 | block |
| 130 | block |
| 132 | block |
| 140 | list of tasks |
| 150A-E | rows of tasks |
| 152 | type of task column |
| 154 | date column |
| 156 | thumbnail image column |
| 158 | button column |
| 160A-D | email button |
| 162 | print button |
| 164 | order prints online button |
| 168 | close button |
| 180 | To Do list GUI screen |
| 300 | digital camera |
| 302 | flash |
| 303 | user controls |
| 304 | control processor and timing generator circuit |
| 306 | clock drivers |
| 308 | auto-exposure detectors |
| 310 | focus motors |
| 312 | zoom lens |
| 314 | image sensor |
| 316 | ASP & A/D converter circuit |
| 318 | DRAM buffer memory |
| 320 | image processor |
| 322 | host interface |
| 324 | memory card interface |
| 326 | RAM memory |
| 328 | firmware memory |
| 330 | removable memory card |
| 332 | color LCD image display |
| 342 | interface cable |
| 400 | root directory |
| 410 | MISC directory |
| 412 | control file |
| 414 | control file |
| 420 | DCIM directory |
| 430 | subdirectory |
| 432 | image file |
| 434 | image file |
| 436 | image file |
| 438 | image file |
| 440 | image file |
| 442 | image file |
| 444 | image file |
| 446 | image file |
| 448 | image file |
| 460 | subdirectory |
| 462 | image file |
| 464 | image file |
| 500 | address book GUI screen |
| 502 | entries |
| 504 | new button |
| 506 | edit button |
| 508 | remove button |
| 510 | check boxes |
| 512 | select all button |
| 514 | deselect all button |
| 516 | Update camera button |
| 520 | camera nickname |
| 522 | email address |
| 524 | first name |
| 526 | last name |

-continued

PARTS LIST

| | |
|---|---|
| 528 | text box |
| 540 | transfer GUI screen |
| 542 | all at once radio button |
| 544 | one touch transfer checkbox |
| 546 | one at a time radio button |
| 548 | text box |
| 549 | pull down arrow icon |
| 550 | checkbox |
| 552 | text box |
| 553 | arrow icon |
| 554 | checkbox |
| 556 | checkbox |
| 558 | transfer button |
| 600 | print GUI screen |
| 602 | tab |
| 604 | tab |
| 606 | tab |
| 608 | tab |
| 610 | tab |
| 612 | setup icon |
| 614 | align paper icon |
| 616 | get pictures icon |
| 618 | edit pictures icon |
| 620 | create To Do icon |
| 622 | order prints icon |
| 624 | text display |
| 628 | text box |
| 630 | arrow icon |
| 632A | radio button |
| 632B | radio button |
| 634 | radio buttons |
| 636 | text box |
| 638 | arrow icon |
| 640 | print button |
| 644 | print options area |
| 650 | print preview window |
| 652A-B | images |
| 660 | thumbnail display area |
| 662A-D | thumbnail images |
| 664 | checkboxes |
| 665 | slider |
| 666 | text box |
| 668 | up/down arrows |
| 680 | order prints online GUI screen |
| 682 | upload progress area |
| 684 | text display |
| 686 | file progress bar |
| 688 | task progress bar |
| 690 | thumbnail image |
| 700 | email GUI screen |
| 702 | text display |
| 704 | radio button |
| 706 | radio button |
| 708 | image size selection area |
| 710 | text box |
| 712 | text box |
| 714 | text box |
| 716 | text box |
| 718 | address book button |
| 720 | thumbnail display area |
| 722A-C | thumbnail images |
| 724 | checkboxes |
| 725 | slider |
| 760A-B | confirmation GUI screen |
| 762A-B | text message |
| 764A-B | ok button |
| 766A-B | cancel button |
| 800 | collection GUI screen |
| 810 | display selection area |
| 812 | single icon |
| 814 | thumbnails icon |
| 816 | details icon |
| 820 | image display area |
| 822A-J | thumbnail images |
| 825 | slider |
| 830 | slide show icon |
| 832 | label icon |

-continued

PARTS LIST

| | |
|---|---|
| 834 | rotate icon |
| 836 | open/edit icon |
| 838 | properties icon |
| 840 | text box |
| 842 | arrow icon |
| 844 | text box |
| 846 | arrow icon |
| 848 | checkbox |
| 850 | view/sort options area |
| 852 | To Do list icon |

What is claimed is:

1. A method of printing stored digital images transferred from an imaging device, comprising:
 a) providing a computer separate from the imaging device and including a memory; the computer receiving and storing images from the imaging device in the computer memory;
 b) the computer receiving at least one print control file produced by the imaging device which indicates a prior intention for printing particular images stored in the computer memory;
 c) the computer responding to the print control file to create and display a list of printing tasks selectable by a computer user;
 d) the computer enabling the user to select at least one of the printing tasks from the list and allowing the user to modify the user selected printing task(s) if desired;
 e) the computer responding to the user selected printing task(s) to initiate the printing of images indicated by the selected task(s); and
 (f) the computer receiving at least one email control file from the imaging device which indicates a prior intention for emailing particular stored images, and wherein the computer responds to the email control file to create and display a list of email tasks selectable by the computer user.

2. The method of claim 1 wherein the transferred digital images include corresponding thumbnail images.

3. The method of claim 2 wherein the displayed list of task(s) includes thumbnail images of corresponding digital images.

4. The method of claim 1 further including the step of allowing the user to modify the user selected email tasks, and further allowing the user to deselect an image or select new images within the user selected email tasks or the user selected printing task(s) as part of allowing the user to modify said email tasks or said printing task(s).

5. A computer readable storage medium having instructions stored therein causing one or more computers to perform the method of claim 1.

6. A method of using stored images captured by a digital camera, comprising:
 a) using the digital camera to capture digital images and store such captured digital images in a digital memory of the digital camera;
 b) a user selecting particular digital images and indicating an intention to email such user selected particular digital images;
 c) the camera producing an email control file including identifiers corresponding to the user selected particular digital images, and storing such email control file in the digital memory of the digital camera;

d) providing a computer separate from the digital camera and including a computer memory; the computer receiving the email control file and images from the digital camera, and storing the received images and the email control file in the computer memory;

e) the computer allows a user to select a preference for handling the email control file and the computer responds to the email control file stored in the computer memory and the user preference to selectively create a to do list indicating at least one email task that can be performed at a future time;

f) the computer displaying the to do list and enabling the computer user to select one of the email tasks; and g) the computer responding to the user selected email task to initiate the emailing of the selected particular images identified in the email control file.

7. The method of claim 6 wherein the email control files further includes an email address where digital images are to be sent.

8. The method of claim 6 wherein the email control file is provided by the camera capturing a first set of digital images and producing a first email control file, the computer receiving the first email control file and the first set of digital images from the digital camera, the computer then causing the first email control file and the first set of digital images to be erased from the digital camera, the digital camera subsequently capturing a second set of digital images and producing a second email control file, and the computer receiving the second email control file and the second set of digital images, prior to step f).

9. The method of claim 7 further including the step of allowing the user to selectively modify the email task prior to the initiation of emailing, including allowing a user to deselect an image or select a new image within the email task as part of allowing the user to modify the email task.

10. A method of capturing and using stored images captured by a digital camera, comprising:

a) using a digital camera to capture digital images and store such captured digital images as digital image files in a digital memory of the digital camera;

b) the digital camera enabling the user to select particular digital images so as to indicate an intention to print such captured digital images;

c) the camera producing a first print control file in accordance with the user indicated intention, and including identifiers corresponding to the user selected particular digital images, and storing such control file in the digital memory of the digital camera, the first print control file being stored separately from the digital image files;

d) providing a computer separate from the digital camera and including a computer memory; the computer receiving the first print control file and images from the digital camera, and storing the received images and the print control file in the computer memory;

e) the computer allows a user to select a preference for handling the first print control file and the computer responds to the first print control file stored in the computer memory and the user preference to selectively create a to do list indicating at least one printing task that can be performed at a future time selectable by the computer user, wherein the at least one printing task identifies the images identified in the first print control file;

f) the computer initiating deletion of the first print control file and the digital images from the digital memory of the digital camera;

g) subsequent to step f), the computer displaying the to do list of selectable printing tasks and enabling the computer user to select one of the printing tasks provided in to do list; and h) the computer responding to the user selected printing task to initiate the printing of images indicated by the selected task.

11. The method of claim 10, further including the steps of: subsequent to step f, providing the steps of:

i) using a digital camera to capture additional digital images and store such additional captured digital images as digital image files in the digital memory;

ii) the user selecting particular digital images from the additional images and indicating an intention to print such captured digital images;

iii) the camera producing a second print control file in accordance with the user indicated intention in step ii), and including identifiers corresponding to the user selected particular digital images, and storing such second print control file in the digital memory, the second print control file being stored separately from the digital image files; and iv) the computer receiving the second print control file from the digital camera.

12. The method of claim 11, further including the step of updating the to do list created in step e) so that the to do list includes a second printing task that identifies the images identified in the second print control file.

13. The method of claim 10, wherein step g) further includes selectively modifying the selected printing task to keep from printing at least one particular digital image identified in the first print control file among a plurality of images.

* * * * *